United States Patent [19]

Milewski

[11] 4,047,013

[45] Sept. 6, 1977

[54] METHOD AND APPARATUS FOR FAST DETERMINATION OF INITIAL TRANSVERSAL EQUALIZER COEFFICIENT VALUES

[75] Inventor: Andrzej Milewski, St-Jeannet, France

[73] Assignee: International Business Machines Corporation, Armonk, N.Y.

[21] Appl. No.: 701,730

[22] Filed: July 1, 1976

[30] Foreign Application Priority Data

July 10, 1975    France ........................ 75.22152

[51] Int. Cl.² .................. G06F 15/34; H04B 3/14
[52] U.S. Cl. ................................. 235/156; 325/42; 333/18; 333/28 R; 333/70 T
[58] Field of Search ............... 235/152, 156; 333/18, 333/28 R, 70 T; 325/41, 42

[56] References Cited

U.S. PATENT DOCUMENTS

| | | | |
|---|---|---|---|
| 3,659,229 | 4/1972 | Milton | 333/18 |
| 3,715,666 | 2/1973 | Mueller et al. | 325/42 |
| 3,864,632 | 2/1975 | Chang | 333/18 X |
| 3,914,691 | 10/1975 | Meadors, Jr. | 333/18 X |
| 3,978,407 | 8/1976 | Forney, Jr. et al. | 325/42 |

*Primary Examiner*—Jerry Smith
*Attorney, Agent, or Firm*—John B. Frisone

[57] ABSTRACT

A method for determining the initial values of the coefficients of a transversal equalizer for a synchronous data transmission system, wherein a training sequence is transmitted to allow the equalizer coefficients to be adjusted to optimum initial values. According to the method, a sequence $(v_i)$ of L elements $v_i$, having a periodic autocorrelation function, only the first coefficient of which is not zero, is derived from a periodic binary pseudo-random sequence $(u_i)$ of L binary elements $u_i$ having a periodic autocorrelation function, the first coefficient of which is equal to L and each of the other coefficients are equal to $-1$. Then, the sequence $(v_i)$ is transmitted through the transmission channel and the initial values of the equalizer coefficients are derived from the received sequence. In a preferred embodiment of the invention the initial values of the equalizer coefficients are derived from the received sequence through a direct method which involves the calculation of the autocorrelation matrix of samples of the transmission channel impulse responses.

8 Claims, 6 Drawing Figures

| STEPS | $X_{n-4}$ | $X_{n-3}$ | $X_{n-2}$ | $X_{n-1}$ | OUTPUT | STEPS | $X_{n-4}$ | $X_{n-3}$ | $X_{n-2}$ | $X_{n-1}$ | OUTPUT |
|---|---|---|---|---|---|---|---|---|---|---|---|
| 1 | 0 | 0 | 0 | 1 | 0 | 9 | 0 | 1 | 0 | 1 | 0 |
| 2 | 0 | 0 | 1 | 0 | 0 | 10 | 1 | 0 | 1 | 1 | 1 |
| 3 | 0 | 1 | 0 | 0 | 0 | 11 | 0 | 1 | 1 | 1 | 0 |
| 4 | 1 | 0 | 0 | 1 | 1 | 12 | 1 | 1 | 1 | 1 | 1 |
| 5 | 0 | 0 | 1 | 1 | 0 | 13 | 1 | 1 | 1 | 0 | 1 |
| 6 | 0 | 1 | 1 | 0 | 0 | 14 | 1 | 1 | 0 | 0 | 1 |
| 7 | 1 | 1 | 0 | 1 | 1 | 15 | 1 | 0 | 0 | 0 | 1 |
| 8 | 1 | 0 | 1 | 0 | 1 | | | | | | |

SEQUENCE = 000100110101111

METHOD AND APPARATUS FOR FAST DETERMINATION OF INITIAL TRANSVERSAL EQUALIZER COEFFICIENT VALUES

BACKGROUND OF THE INVENTION

This invention relates to synchronous data transmission systems and more particularly to a method and an apparatus for determining the initial values of the coefficients of a transversal equalizer.

In data transmission systems, the sequence of bits, or message, to be transmitted is first coverted into a sequence of symbols. Each of them may assume a discrete number of values generally equal to a power of two. Then, these symbols are transmitted through a transmission channel at a given rate in the form of pulses which may or may not be modulated depending on whether or not the transmission system uses a carrier modulation technique. In general, the transmission channels and more particularly the telephone lines, introduce phase and amplitude distortions which modify the shape of the transmitted signals. These distortions are generally due to imperfect characteristics of the transmission channels and are increased by noise introduced into the transmission channel by certain external sources which are more or less difficult to control. In general, amplitude and phase distortions cause an interaction between the successively emitted signals. This interaction is known as intersymbol interference and precludes reliable detection of the transmitted data by the receiver. In high speed data transmission systems, the receiver is generally provided with a device for minimizing the effects of the intersymbol interference before the data are detected. Such a device is known as an equalizer.

The most widely used type of equalizer is the automatic transversal equalizer described, for example, in Chapter 6 of the book, "Principles of Data Communication," by R. W. Lucky, J. Salz and E. J. Weldon, Jr., published by the McGraw-Hill Book Company, New York, in 1968. A typical automatic transversal equalizer consists of a transversal filter, the coefficients of which are automatically adjusted so as to satisfy a given performance criterion. In general, during a first so-called "training period," a series of isolated test pulses or pseudo-random training sequence is transmitted to allow the adjustment of the equalizer coefficients to initial values as close as possible to optimum values. At the end of the training period, the initial values of the coefficients are fixed during the transmission of the message if the equalizer is not adaptive or the coefficients can be continuously adjusted during the transmission of the message if the equalizer is adaptive.

The article, "Automatic Equalization for Digital Communication," by R. W. Lucky, published in the Bell System Technical Journal of April, 1965, pages 547-588, shows the use of isolated test pulses for determining the initial values of the coefficients of an automatic transversal equalizer. In the device described in this article, after reception of each test pulse, the coefficients are adjusted so as to force to zero the shape of the impulse response at sampling instants other than a predetermined sampling instant chosen as a reference. This technique is slow and requires a great deal of power in the emitted signal when the channel is very noisy.

The article, "An Automatic Equalizer for General Purpose Communication Channels," by R. W. Lucky and H. R. Rudin published in the same journal of November, 1967, pages 2179-2208, describes the use of pseudo-random binary sequences for determining the initial values of the coefficients of an automatic transversal equalizer. In the described device, the coefficients are adjusted so as to minimize the mean square error between the equalizer output signals and a locally generated sequence identical to the one transmitted by the emitter. This technique is also slow since it requires the preliminary synchronization of the local sequence with respect to the emitted sequence and does not, in general, provide optimum initial values of the coefficients.

When the distortion characteristics of the transmission channel vary between successive messages, which is generally the case when telephone lines are used as a transmission channel, it is necessary to provide a training period prior to the transmission of each message. The efficiency of a data transmission system is generally defined as the ratio existing between the time required to transmit a message and the time the line is occupied, the latter period mainly corresponding to the training period of the equalizer to which must be added the duration of the message. To maintain this efficiency at an appropriate level in high speed transmission systems, which systems transmit a message in a few tenths of a millisecond, it is imperative to provide a method and apparatus which reduces as much as possible the training period, i.e., to determine, as quickly as possible, the initial values of the equalizer coefficients.

As indicated above, both described techniques for determining the initial values of the transversal equalizer coefficients are slow.

The article, "Cyclic Equalization — A New Rapidly Converging Equalization Technique for Synchronous Data Communication," by K. H. Mueller and D. A. Spaulding, published in the Bell System Technical Journal of February, 1975, pages 369-406, describes a technique permitting rapid determination of the initial values of the transversal equalizer coefficients. According to this technique, the use of a periodic binary pseudo-random sequence whose period is equal to that of the equalizer, avoids the preliminary synchronization of the local sequence with the emitted sequence. The coefficients are conventionally adjusted to minimize the mean square error between the equalizer output signals and the local sequence without synchronizing the latter with the emitted sequence. At the end of the training period, the coefficients are cyclically shifted to associate the highest coefficient to a reference tap of the equalizer. However, this technique which has greatly improved the fast determination of the initial values of transversal equalizer coefficients, exhibits disadvantages when it is used with binary pseudo-random sequences as described in the article. In effect, the use of these sequences does not theoretically provide the optimum values of the equalizer coefficients nor does it provide them as quickly as possible.

An object of this invention is to overcome these disadvantages by providing a method and an apparatus for determining the optimum theoretical values of transversal equalizer coefficients.

Another object of this invention is to provide a method and an apparatus providing a very fast determination of the optimum theoretical values of transversal equalizer coefficients.

Another object of this invention is to provide a method and an apparatus which yields a very fast determination of the optimum theoretical values of transversal equalizer coefficients by using a direct method.

In general, this invention provides a process for determining the initial values of the coefficients of a transversal equalizer, including the following steps.

1. selecting a sequence $(u_i)$ of L binary elements $u_i$ among the periodic binary pseudo-random sequences of length L, such that:

$$A_0 = L \text{ and } A_j = -1 \, j = 1,2,\ldots,(i\,L-1)$$

where $$A_j = \frac{L-1}{\sum_{i=0}} u_i u_{i+j}$$

2. adding to each element $u_i$ of the sequence $(u_i)$, a corrective term m determined by the following relation:

$$m = \frac{-1 \pm \sqrt{1 + L}}{L}$$

whereby building a sequence $(v_i)$ of L elements $v_i$ where $v_i = u_i + m$;

3. transmitting the sequence $(v_i)$ obtained in this way, and
4. determining the values of the equalizer coefficients from the received sequence.

According to a preferred embodiment of the invention, the values of the equalizer coefficients are determined by performing the following steps:

1. determining samples $r_j$ of the impulse response of the transmission channel by using the following cross-correlation relation:

$$r_j = \frac{1}{L} \sum_{i=1}^{L} x_{i+j} v_i$$

in which the $x_i$'s represent the elements of the received sequence, 2. calculating autocorrelation matrix B of the samples of the transmission channel impulse response and
3. determining the values of the equalizer coefficients by using the following matrix relation:

$$C_{opt} = B^{-1} R$$

in which:
$C_{opt}$ is the column matrix of the coefficient set,
$B^{-1}$ is inversed matrix B and
R is the inversed column vector of the samples of the transmission channel impulse reponse.

These and other objects, advantages and features of the present invention will become more readily apparent from the following specification when taken in conjunction with the drawings.

Figure 1:
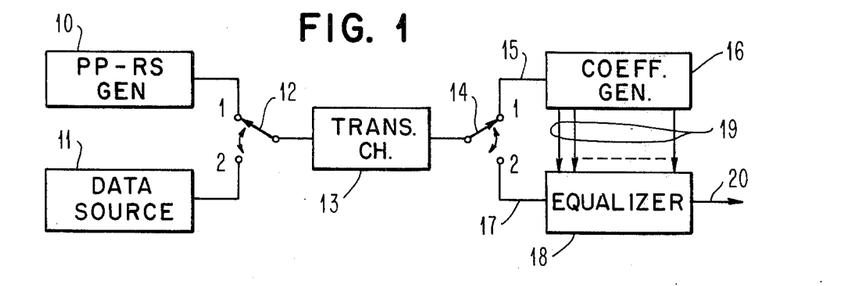
FIG. 1 is a block diagram of a data transmission system including a preferred embodiment of the invention.

FIG. 1 shows a block diagram of a data transmission system including a preferred embodiment of the invention. To simplify the drawing, it includes only those elements necessary for understanding the invention. Devices included in all data transmission systems such as the modulator, demodulator, sampling devices, digital-to-analog converters, filters, clock recovery devices, etc. have not been shown. The system shown in the figure includes a periodic pseudo-random sequence 10 which will be described later, and a data source 11, the outputs of which are respectively connected to inputs 1 and 2 of a two-position switch 12. The common output of switch 12 is connected to the input of a transmission channel 13, the output of which is connected to the common input of a two-position switch 14. Output 1 of switch 14 is connected through line 15 to the input of a coefficient generator 16 which will be described withreference to FIGS. 3 to 6. The output 2 of switch 14 is connected by a line 17 to the input of a conventional automatic transversal equalizer 18. The outputs of coefficient generator 16 are applied to equalizer 18 by lines 19. The equalized received signals appear at the output of equalizer 18 on line 20.

During the training period, switch 12 is placed in position 1 and connects the output of sequence generator 10 to the input of transmission channel 13. Switch 14 is also placed in position 1 and connects the output of transmission channel 13 to the input of coefficient generator 16. The pseudo-random sequence provided by sequence generator 10 is transmissted through transmission channel 13 and applied to the input of coefficient generator 16 which provides the values of the equalizer coefficients which are applied to equalizer 18 by lines 19, at the end of the training period. Then switches 12 and 14 are placed in position 2 and the data message provided by data source 11 is transmitted through transmission channel 13 and applied directly to the input of equalizer 18.

Now we will proceed to the description of the invention with reference to the remaining figures. The theory and some examples of the application of pseudo-random sequences can be found, for example, in the book "Digital Communications with Space Applications," by S. W. Golomb, published by Prentice Hall, Inc., Englewood Cliffs, N.J., 1964. So far, one has mainly used as training sequences, binary periodic pseudo-random sequences and, more particularly, binary maximum length pseudo-random sequences. But theoretically, these sequences do not provide optimum values of the coefficients of a transversal equalizer, nor do they yield them in the fastest way. This is mainly due to the fact that there is no term in the autocorrelation matrix of these sequences which is null. According to this invention, this disadvantage is overcome by building from the binary periodic pseudo-random sequences, pseudo-random sequences permitting a fast determination of the optimum coefficient values.

A binary pseudo-random sequence of period or length L will be referenced $(u_i)$, $$(u_i) = u_0 u_1 u_2 \ldots u_{L-1}$$

in which the $u_i$'s are equal to $\pm 1$.

A sequence of length L is a sequence of L elements. The autocorrelation matrix of this sequence can be written as follows:

$$A = \begin{bmatrix} A_0 & A_1 \cdots & A_{L-1} \\ A_1 & A_0 & A_{L-2} \\ \vdots & & \vdots \\ A_{L-1} & & A_0 \end{bmatrix}$$

in which $$A_j = \sum_{i=0}^{L-1} u_i u_{i+j}$$

Terms $A_j$ are known as the coefficients of the autocorrelation function of the sequence $(u_i)$.

According to the invention, first one chooses sequences $(u_i)$ with the following property P1

$$A_0 = L \text{ and } A_j = -1 \text{ for } j=1, \ldots, (L-1).$$

This property causes the sum of the sequence elements to be equal to 1.

Figure 2:
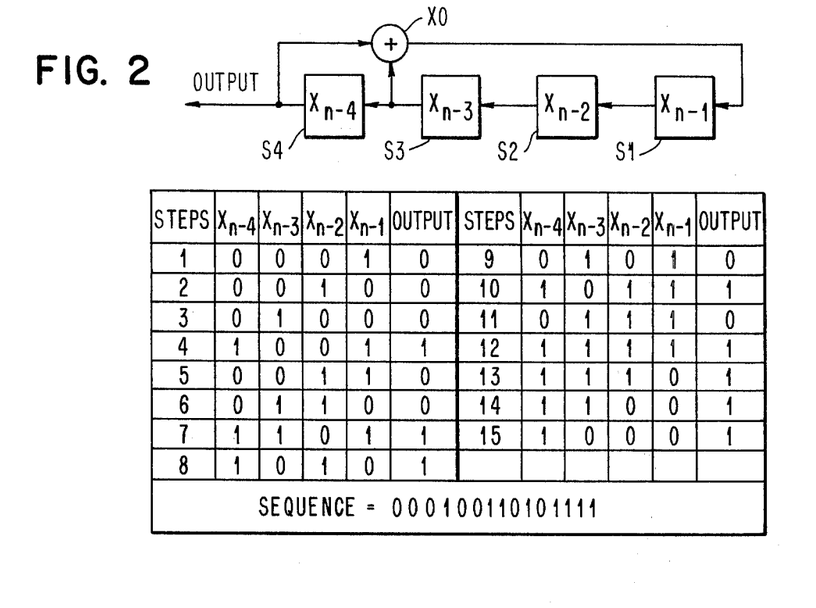
FIG. 2 is a diagram of a generator of binary maximum length pseudo-random sequences.

The binary pseudo-random sequences known as the binary maximum length pseudo-random sequences are provided with property P1. These last sequences are very often used as training sequences, as indicated in page 396 of the above indicated article by K. H. Mueller and D. A. Spaulding. For example, a definition of the binary maximum length pseudo-random sequences can be found in the above indicated book by W. G. Golomb and in paragraph 8-3 of the book, "Error Correcting Codes," by W. W. Peterson, jointly published by the MIT Press and John Wiley, Sons, Inc., New Yor, 1961. Such a sequence of length L is generated by a shift register with $k$ stages, L and $k$ being linked by the following relation: $L = 2^k - 1$. FIG. 2 schematically shows a shift register with four stages S1-S4, used for generating a sequence of length $L = 15$. In this figure, which is incorporated in this description, there are shown the shift register and the various states of this register during the sequence generation. The outputs of the third and fourth stages are applied to the inputs of an Exclusive OR circuit XO, the output of which is applied to the input or first stage of the shift register. A clock, not illustrated, controls the shift of the register, the output of which is taken at the output of the fourth stage. At the beginning, the register is loaded with any word of four bits, other than the word 0000. In this figure, the register is initially loaded with word 0001. After fifteen shifts, the following sequence is obtained at the output:

$$0\ 0\ 0\ 1\ 0\ 0\ 1\ 1\ 0\ 1\ 0\ 1\ 1\ 1\ 1 \quad (1)$$

It should be noted that at the sixteenth shift, the register is back in its original state. If in this sequence, $-1$ is substituted for 0, a sequence with propery P1 is obtained. Then this sequence can be written as follows:

$$-1-1-1\ 1-1-1\ 1\ 1-1\ -1\ 1\ 1\ 1 \quad (2)$$

Another set of periodic binary pseudo-random sequences with properyt P1 is formed by the set of sequences, the elements of which are determined by the quadratic and non-quadratic residues for prime number of the form 4K-1 which can be found, for example, in the article, "Sequences with Small Correlation," by R. Turyn, in the book, "Error Correcting Codes," by H. B. Mann and published by John Wiley and Sons, Inc., New York, 1968. The elements of these sequences are mathematically calculated as described in the references indicated by R. Turyn. These sequences have a length L defined by $$L = 4K-1$$

where L is a prime number and $K$ a positive integer. For instance, for $L = 11$, one has the following sequence:

$$1\ 1-1\ 1\ 1\ 1-1-1-1\ 1-1 \quad (3)$$

The second step of the method according to this invention consists in adding a constant m to each element $u_i$ of the sequences showing property P1. This constant is determined by the following equation:

$$Lm^2 + 2m - 1 = 0 \quad (4)$$

The values of $m$ are the solutions of the equation:

$$m = \frac{-1 \pm \sqrt{1+L}}{L} \quad (5)$$

For instance, for sequence (2) of length $L = 15$, one has:

$$m = 0, 2 \text{ and } m = -0, 33$$

By choosing the numerically smallest value for $m$, i.e., $m = 0.2$. sequence (2) becomes:

$$0.8;\ -0.8;\ -0.8;\ +1.2;\ -0.8;\ -0.8;\ +1.2;\ +1.2; \\ -0.8;\ +1.2;\ -0.8;\ +1.2;\ +1.2;\ +1.2;\ +1.2. \quad (6)$$

In the same way, for sequence (3) of length $L$ 32 11, one has $$m = \frac{-1 \pm \sqrt{12}}{11}$$

By choosing the numerically smallest value form, i.e., $m = 0.224$, sequence (3) becomes:

$$-1.224;\ +1.224;\ -0.776;\ +1.224;\ +1.224;\ +1.224; \\ -0.776;\ -0.776;\ -0.766;\ +1.224;\ -0.776 \quad (7)$$

Adding the constant $m$ to each of the elements $u_i$ of the sequence $(u_i)$ yields a new sequence $(v_i)$ of L elements $V_i$, where $V_i = u_i + m$.

These sequences $(v_i)$ are provided with an important property to be shown now.

The autocorrelation matrix of these sequences $(v_i)$ can be written as follows:

$$A1 = \begin{bmatrix} A_0^1 A_1^1 A_2^1 \ldots A_{L-1}^1 \\ A_1^1 A_0^1 A_1^1 & A_{L-2}^1 \\ A_2^1 A_1^1 A_0^1 & \cdot \\ \cdot & \cdot \\ \cdot & \cdot A_1^1 \\ A_{L-1}^1 \ldots\ldots A_0^1 \end{bmatrix}$$

where $$(8)$$

-continued
$$A_j^1 = \sum_{i=0}^{L-1} v_i v_{i+j}$$

Terms $A_j^1$ are known as the coefficients of the autocorrelation function of the sequence $(v_i)$.

Since
$$v_i = u_i + m$$

Relation (8) becomes:

$$A_j^1 = \sum_{i=0}^{L-1} (u_i + m)(u_{i+j} + m) \quad (9)$$

$$A_j^1 = \sum_{i=0}^{L-1} u_i u_{i+j} + m \sum_{i=0}^{L-1} (u_i + u_{i+j}) + Lm^2 \quad (10)$$

From above, one has:

$$\sum_{i=0}^{L-1} u_i u_{i+j} = A_j$$

Then, relation (10) can be written as follows:

$$A_j^1 = A_j + m \sum_{i=0}^{L-1} (u_i + u_{i+j}) + Lm^2 \quad (11)$$

Taking into account the fact that sequences $(u_i)$ are provided by definition, with property P1, when $j \neq 0$, one has:

$$A_j = -1$$

and $$\sum_{i=0}^{L-1} (u_i + u_{i+j}) = 2$$

since the sum of the elements of sequence $(u_i)$ is equal to 1.

When $j \neq 0$, relation (11) becomes:

$$A_j^1 = -1 + 2m + Lm^2 \quad (12)$$

Thus, when $j \neq 0$, from (4), one has:

$$A_j^1 = 0$$

Therefore, sequences $(V_i)$ are periodic pseudorandom sequences provided with the following property P2:

$$A_0^1 \neq 0 \text{ and } A_j^1 = 0 \text{ for } j=1, \ldots, (L-1)$$

In addition, it will be assumed in the following that:

$$A_0^1 = L$$

which can be conventionally obtained by dividing each term of sequence $(v_i)$ by an appropriate factor since:

$$A_0^1 = \sum_{i=0}^{L-1} v_i^2$$

It will be assumed in the following that emitted sequences $(v_i)$ show the following property P3:

$$A_0^1 = L \text{ and } A_j^1 = 0 \text{ when } j=1, \ldots, (L-1)$$

Sequences $(v_i)$ being determined in this way, it is easy to conceive sequence $(v_i)$ generator 10 of FIG. 1. Generator 10 can, for instance, be an L-stage ring shift register into which the L binary-coded elements $v_i$, $i=0, 1, \ldots, (L-1)$ are stored. A clock will control the shift register shift at the normal emission rate of the data symbols.

The third step of the method consists in emitting the chosen sequence $(v_i)$ through the transmission channel at the normal emission rate of the data symbols or sampling rate.

The fourth step of the inventive process consists in determining the values of the equalizer coefficients from the received sequence. This determination can be carried out in a way known in the art by using, for instance, the technique described in the above-indicated article by R. W. Lucky and H. R. Rudin or in the above-indicated article by K. H. Mueller and D. A. Spaulding.

According to a preferred embodiment of the invention, a direct method is used for determining the values of the equalizer coefficients. The techniques generally used for determining the values of the equalizer coefficients as the ones described in the last two mentioned articles are based on the implementation of the following matrix relation:

$$C_{opt} = M^- E \quad (13)$$

where
$C_{opt}$ is the column vector the terms of which are the equalizer coefficients,
$M$ is the autocorrelation matrix of the received sequence and,
$E$ is the column vector the terms of which are the terms of the cross-correlation between the emitted sequence and the received sequence.

In fact, relation (13) does not provide the theoretical optimum values of the equalizer coefficients. The expression providing the theoretical optimum values of the equalizer coefficients is as follows:

$$C_{opt} = B^{-1} R \quad (14)$$

where
$B$ is the autocorrelation matrix of the impulse response of the transmission channel and,
$R$ is the inversed column vector the terms of which are the samples of the impulse response of the transmission channel. Here the term "inversed" means that the first term of vector R is the last sample of the impulse response.

Relation (13) is identical to expression (14) only when the sequence is of infinite length, which is not true in practice.

The preferred embodiment of the invention uses the implementation of expression (14) for determining the values of the equalizer coefficients. According to the invention, the implementation of expression (14) includes the following steps:
direct determination of vector R,
calculation of matrix B,
determination of vector $C_{opt}$.

The implementation of expression (14) does not require the use of the equalizer itself and it is the reason why in FIG. 1 a coefficient generator 16 distinct from equalizer 18 is illustrated.

Figure 3:
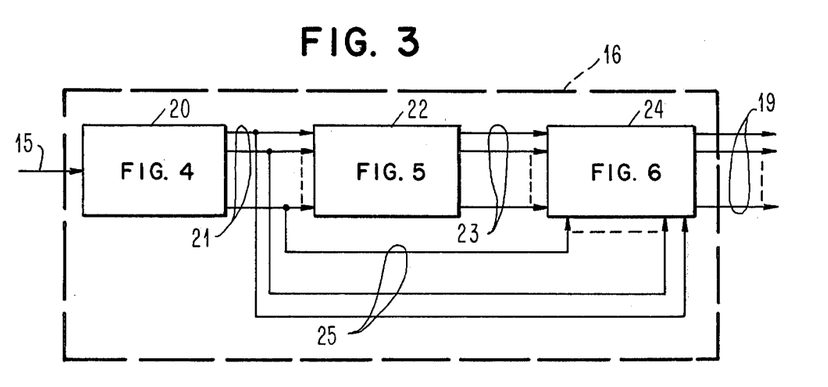
FIG. 3 is a block diagram of the coefficient generator shown in FIG. 1.
Figure 4:
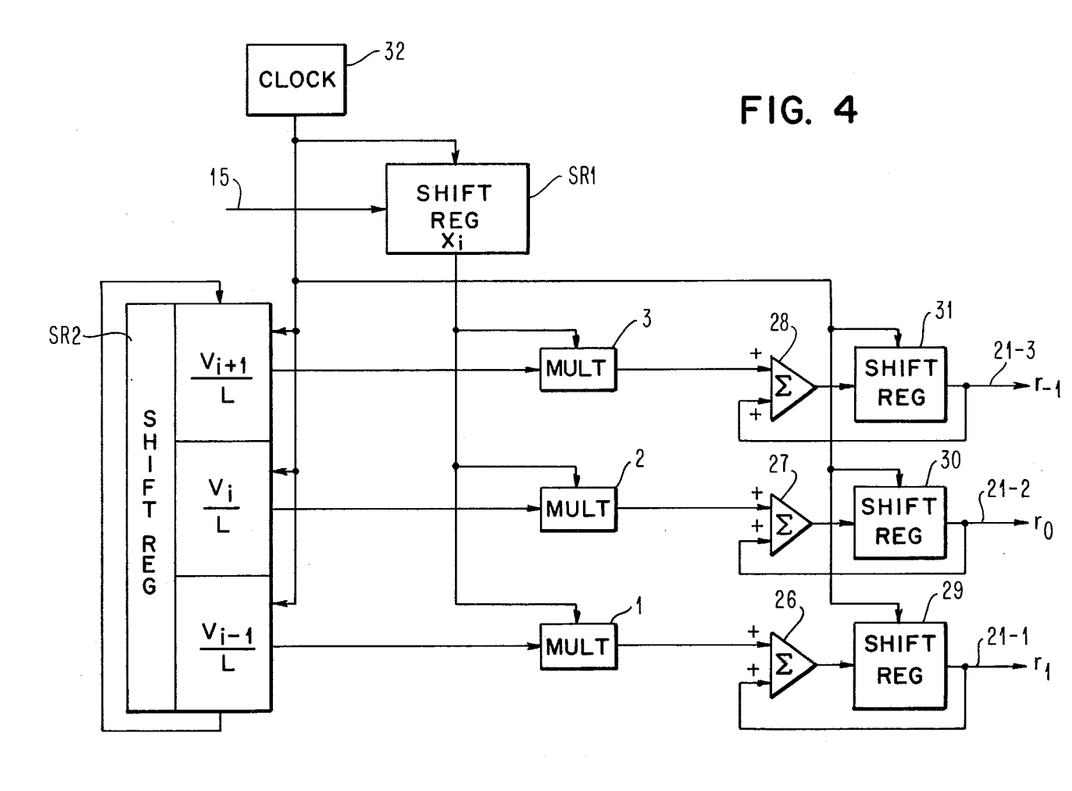
FIG. 4 illustrates an embodiment of a device for determining the transmission channel impulse response samples, shown as a block in FIG. 3.

For a better understanding of the invention, FIG. 3 shows a block diagram of a digital embodiment of coefficient generator 16 as an example. The received sequence is applied through line 15 to the input of a device 20, illustrated in greater detail in FIG. 4, provided for determining the samples of the impulse response of the transmission channel. These samples are applied through lines 21, to the input of a device 22, illustrated in greater detail in FIG. 5, which calculates the autocorrelation matrix of said samples. The terms of this matrix are applied thru lines 23 to the input of a device 24, illustrated, provided for determining the equalizer coefficients, and which receives in addition, the samples determined by device 20 thru lines 25. These coefficients are applied to transversal equalizer 18 thru lines 19.

FIG. 4 illustrates in detail a digital embodiment of device 20 for determining the samples of the transmission channel impulse response.

It is assumed that length L of emitted sequence $(V_i)$ is equal to or exceeds the length of the transmission channel pulse response.

If the impulse response samples are referenced $r_n$, one has $$r_n = 0 \text{ if } n < N_1 \text{ or } n > N_2$$

with $$L \geq N_2 - N_1 + 1$$

The $i^{th}$ element $x_i$ of the received sequence can be conventionally written as follows:

$$x_i = \sum_{n=N_1}^{N_2} v_{i-n} r_n \quad (15)$$

The $j^{th}$ crosscorrelation function between the $x_i$'s and the $v_i$'s can be conventionally written as follows:

$$\sum_{i=0}^{L-1} x_{i+j} v_i \quad (16)$$

By including (15) in (16), one has:

$$\sum_{i=0}^{L-1} x_{i+j} v_i = \sum_{i=0}^{L-1} \left( \sum_{n=N_1}^{N_2} v_{i+j-n} r_n \right) v_i \quad (17)$$

$$\sum_{i=0}^{L-1} x_{i+j} v_i = \sum_{n=N_1}^{N_2} r_n \sum_{i=0}^{L-1} v_{i+j-n} v_i \quad (18)$$

From (8), one has:

$$\sum_{i=0}^{L-1} x_{i+j} v_i = \sum_{n=N_1}^{N_2} r_n A_{n-j}^1 \quad (19)$$

From property P2 of sequences $(v_i)$, the only term which is not null is term $A_0^1$ which corresponds to $n=j$, in (19). Relation (19) becomes:

$$\sum_{i=0}^{L-1} x_{i+j} v_i = r_j A_0^1 \quad (20)$$

From property P3 of sequences $(v_i)$, one has, in addition:

$$\sum_{i=0}^{L-1} x_{i+j} v_i = L r_j \quad (21)$$

The device shown in FIG. 4 determines samples $r_j$ of the transmission channel impulse response by implementing expression (21).

Figure 5:
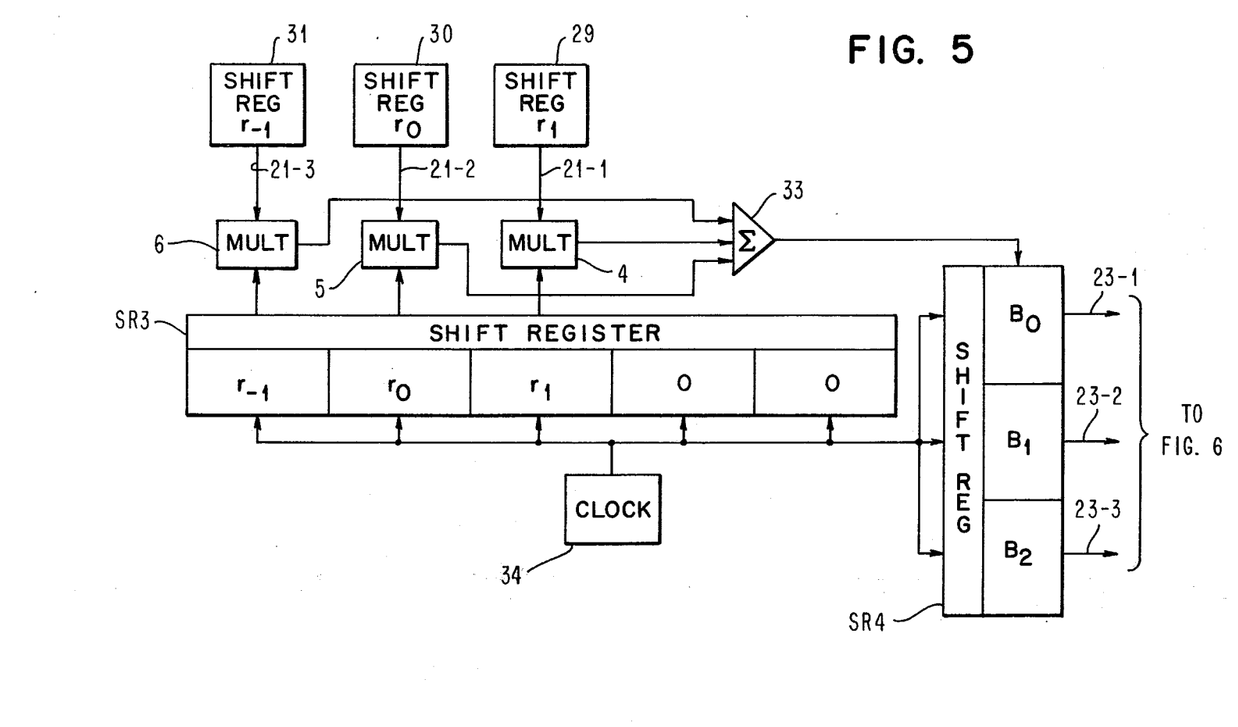
FIG. 5 shows a device for calculating the autocorrelation matrix of the transmission channel impulse response sample, shown as a block in FIG. 3.
Figure 6:
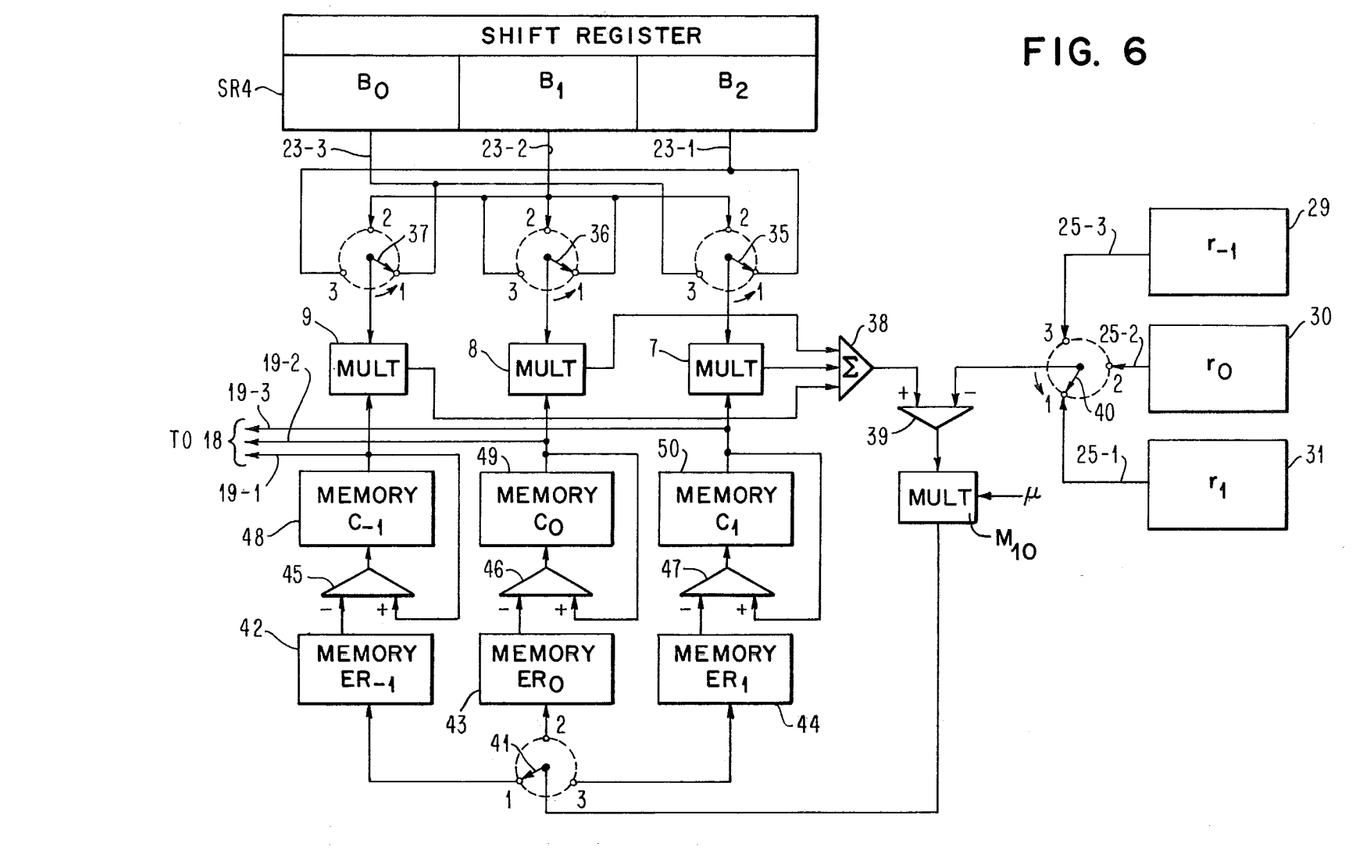
FIG. 6 shows a device for determining the equalizer coefficient values, shown as a block in FIG. 3.

For a better understanding of the invention, it is assumed in the block diagram shown in FIG. 4, as in the ones shown in FIGS. 5 and 6, that emitted sequence $(v_i)$ has a length $L=3$. The output of transmission channel 13 is connected through switch 14 in position 1 and line 15, to the input of a one-stage shift register SR1. In addition, the device shown in the figure includes a three-stage shift register SR2 in closed loop. The output of shift register SR1 is connected in parallel to a first input of three binary multipliers M1, M2 and M3, the second inputs of which are respectively connected to the outputs of the three stages of shift register SR2. The outputs of multipliers M1, M2 and M3 are respectively connected to a first input of three binary adders 26, 27 and 28. The outputs of the three adders 26, 27 and 28 are respectively connected to the inputs of three one-stage shift registers 29, 30 and 31, the outputs of which are respectively connected to the second input of the three adders 26, 27 and 28. In addition, the outputs of shift registers 29, 30 and 31 are connected to lines 21 of FIG. 3 which are referenced 21-1, 21-2, and 21-3, respectively. A local clock 32 controls the shift of registers SR1, SR2, 29, 30 and 31 at the nominal emission rate of the symbols.

In operation, sequence $(v_i)$ previously divided by L is stored into shift register SR2. When the first element $x_i$ of the received sequence is stored into shift register SR1, it is multiplied, in the same time, by the following quantities:

$$\frac{v_{i-1}}{L}, \frac{v_i}{L} \text{ and } \frac{v_{i+1}}{L}$$

respectively stored in the first, second and third stages of shift register SR2, by means of multipliers M1, M2 and M3, respectively. The following products:

$$\frac{1}{L} x_i v_{i-1}, \frac{1}{L} x_i v_i, \text{ and } \frac{1}{L} x_i v_{i+1}$$

are respectively stored in registers 29, 30 and 31 through adders 26, 27 and 28, respectively. When the next element $x_{i+1}$ is received, the contents of registers SR1, SR2, 29, 30 and 31 are shifted by one stage. Then, multipliers M1, M2 and M3 respectively provide the following products:

$$\frac{1}{L} x_{i+1} v_i, \frac{1}{L} x_{i+1} v_{i+1}, \text{ and } \frac{1}{L} x_{i+1} v_{i+2}.$$

These products are respectively accumulated with the following products:

$$\frac{1}{L} x_i v_{i-1}, \frac{1}{L} x_i v_i, \text{ and } \frac{1}{L} x_i v_{i+1}$$

which were respectively stored in registers 29, 30 and 31. The operation is completed when the L elements of the sequence are received. Then, one respectively obtains in registers 29, 30 and 31, the values of samples $r_1$, $r_0$ and $r_{-1}$ of the channel impulse response as defined by expression (21).

Now, a digital embodiment of device 22 provided for calculating autocorrelation matrix B, will be described with reference to FIG. 5. For a better understanding of the invention, registers 29, 30 and 31 of FIG. 4 are shown again in FIG. 5. The device shown on the figure includes, in addition, a five-stage shift register SR3. The outputs of registers 29, 30 and 31 are connected through lines 21-1, 21-2 and 21-3 respectively, to a first input of three multipliers M4, M5 and M6, the second inputs of which are respectively connected to the outputs of the first three stages of shift register SR3. The outputs of multipliers M4, M5 and M6 are connected to the three inputs of a summing device 33, the output of which is connected to the input of a three-stage shift register SR4. The outputs of the first, second and third stages of shift register SR4 are connected to coefficient determining device 24, thru lines 23 of FIG. 3 which are referenced 23-1, 23-2 and 23-3, respectively. A local clock 34 controls the shift of shift registers SR3 and SR4.

The function of the device shown in the figure consists in calculating autocorrelation matrix B of the samples $r_j$ of the channel impulse response.

In the illustrated example, matrix B can be written as follows:

$$B = \begin{bmatrix} B_0 & B_1 & B_2 \\ B_1 & B_0 & B_1 \\ B_2 & B_1 & B_0 \end{bmatrix}$$

where (22)

$$B_k = \sum_{j=-1}^{+1} r_j r_{j+k} \quad k = 0, 1, 2$$

The device shown in FIG. 5 implements expression (22). To this end, samples $r_{-1}$, $r_0$ and $r_1$ are respectively loaded into the first, second and third stages of shift register SR3 and the other stages of this shift register are loaded with zeroes. As indicated above, at the end of the operation carried out for determining samples $r_j$, samples $r_{-1}$, $r_0$ and $r_1$, respectively, are available in registers 31, 30 and 29. The output of summing device 33 provides the following term:

$$B_0 = r_{-1}^2 + r_0^2 + r_1^2$$

which is stored in the first stage of shift register SR4. Under the control of local clock 34, the contents of shift register SR3 are shifted by one stage to the left and $B_o$ is shifted into the second stage of shift register SR4. Then, the output of summing device 33 provides the following term:

$$B_1 = r_{-1} r_0 + r_0 r_1$$

which is stored in the first stage of shift register SR4. Again the contents of shift registers SR3 and SR4 are shifted by one stage and then the output of summing device 33 provides the following term:

$$B_2 = r_{-1} r_1$$

which is stored in shift register SR4. At the end of the operation, terms $B_0$, $B_1$, $B_2$ of matrix B are available in shift register SR4. It should be noted that the calculation speed of these terms is independent from the emission rate of the data symbols and is limited only by the performance of the components in use.

After having determined matrix B, the equalizer coefficients can be obtained as indicated above from expression (14) recalled below:

$$C_{opt} = B^{-1} R \quad (14)$$

A first solution consists in inversing matrix B. This solution requires a large calculation power and one prefers to solve equation (14) by using the gradient method well known in the art and which is described, for instance, in the above indicated article by K. H. Mueller and D. A. Spaulding.

The gradient method is an iterative adjustment method which can be defined by the following relation:

$$C^{(n)} = C^{(n-1)} - \mu(BC^{(n-1)} - R) \quad (23)$$

where $C^{(n-1)}$ and $C^{(n)}$ respectively represent the coefficient column vectors at the $(n-1)^{th}$ and $n^{th}$ iteration, and $\mu$ is a constant. As the iteration reaches its convergence point:

$$C^{(n)} = C^{(n-1)} = C_{opt}$$

and $$B \, C_{opt} = R$$

or $$C_{opt} = B^{-1} R$$

FIG. 6 illustrates a digital embodiment of the coefficient determining device 24 and implements relation (23). For a better understanding of the invention, shift registers SR4, 29, 30 and 31 of FIG. 5 are shown again in this figure. The illustrated device includes three 3-position rotary switches 35, 36 and 37. The output of the first stage of shift register SR4 containing term $B_2$, is connected in parallel to position 1 of switch 35 and to position 3 of switch 37. The output of the second stage of shift register SR4 is connected in parallel to position 2 of switch 35, to position 1 and 3 of switch 36 and to position 2 of switch 37. The output of the third stage of SR4 is connected in parallel to position 3 of switch 35, to position 2 of switch 36 and to position 1 of switch 37. The common inut terminals of switches 35, 36 and 37 are connected respectively to a first input of three binary multipliers M7, M8 and M9, the outputs of which are connected to the inputs of summing device 38. The output of summing device 38 is connected to the (+) input of a binary subtractor 39, the (−) input of which is connected to the common input terminal of a 3-position rotary switch 40. Positions 1, 2 and 3 of switch 40 are respectively connected to the outputs of registers 31, 30 and 29 through lines 25 of FIG. 3 and referenced 25-1, 25-2 and 25-3, respectively. The output of subtractor 39 is connected to an input of a binary multiplier M10 which receives the $\mu$ value at its second input. The output of multiplier M10 is connected to the common input terminal of a 3-position rotary switch 41, positions 1, 2 and 3 of which are respectively connected to the input of three memory elements 42, 43 and 44. The outputs of the three memory elements 42, 43 and 44 are respectively connected to the (−) input of three binary subtractors 45, 46 and 47. The outputs of subtractors 45, 46 and 47 are respectively connected to the input of three memory elements 48, 49 and 50, the outputs of which are respectively connected to the input of multipliers M9, M8 and M7. In addition, the outputs of memeory elements 48, 49 and 50 are connected respectively to the (+) input of subtractors 45, 46 and 47. The coeffecint optimum values are applied to equalizer 19 of FIG. 1 through lines 19-1, 19-2, and 19-3 respectively connected to an output of storing elements 48, 49 and 50.

In the example shown in FIG. 6, relation (23) can be written as follows:

$$\begin{bmatrix} c_{-1}^{(n)} \\ c_0^{(n)} \\ c_1^{(n)} \end{bmatrix} = \begin{bmatrix} c_{-1}^{(n-1)} \\ c_0^{(n-1)} \\ c_1^{(n-1)} \end{bmatrix} - \mu \left\{ \begin{bmatrix} B_0 B_1 B_2 \\ B_1 B_0 B_1 \\ B_2 B_1 B_0 \end{bmatrix} \begin{bmatrix} c_{-1}^{(n-1)} \\ c_0^{(n-1)} \\ c_1^{(n-1)} \end{bmatrix} - \begin{bmatrix} r_1 \\ r_0 \\ r_{-1} \end{bmatrix} \right\} \quad (24)$$

or $$\begin{bmatrix} c_{-1}^{(n)} \\ c_0^{(n)} \\ c_1^{(n)} \end{bmatrix} = \begin{bmatrix} c_{-1}^{(n-1)} \\ c_0^{(n-1)} \\ c_1^{(n-1)} \end{bmatrix} - \mu \begin{bmatrix} ER_{-1}^{(n-1)} \\ ER_0^{(n-1)} \\ ER_1^{(n-1)} \end{bmatrix} \quad (25)$$

In operation, terms $B_0$, $B_1$, $B_2$ are respectively stored in the third, second and first stages of shift register SR4 and samples $r_{-1}$, $r_0$ and $r_1$ are respectively stored in registers 29, 30 and 31. Let us assume that we are at the end of the $(n\text{-}1)^{th}$ iteration and that the values of $$c_{31,1}^{(n-1)}, c_0^{(n-1)} \text{ and } c_1^{(n-1)}$$

are available in memory elements 48, 49 and 50, respectively. Quatities:

$$ER_{-1}^{(n-1)}, ER_0^{(n-1)} \text{ and } ER_1^{(n-1)}$$

are successively calculated when all switches 35, 36 and 37, 40 and 41 are simultaneously in positions 1, 2 and 3.

When all the switches are in position 1, summing device 38 outputs the following quantity:

$$c_1^{(n-1)} B_2 + c_0^{(n-1)} B_1 + c_{-1}^{(n-1)} B_0$$

Then, the output of subtractor 39 provides the following quantity:

$$ER_{-1}^{(n-1)} = (c_1^{(n-1)} B_2 + c_0^{(n-1)} B_1 + c_{-1}^{(n-1)} B_0) - r_1$$

The output of multiplier M10 provides quantity $\mu ER_{-1}^{(n-1)}$ which is stored in memory element 42. In the same way, quantities $\mu ER_0^{(n-1)}$ and $\mu ER_1^{(n-1)}$ are calcualted, and stored in memory elements 43 and 44 when all the switches are respectively in position 2 and 3. Then the following values:

$$c_{-1}^{(n-1)}, c_0^{(n-1)} \text{ and } c_1^{(n-1)}$$

are incremented with the following quantities:

$$\mu ER_{-1}^{(n-1)}, \mu ER_0^{(n-1)} \text{ and } \mu ER_1^{(n-1)}$$

by means of subtractors 45, 46 and 47 and the following values:

$$c_{-1}^{(n)}, c_0^{(n)} \text{ and } c_1^{(n)}$$

obtained in this way, are respectively stored in memory elements 48, 49 and 50. When the convergence point is reached, the obtained coefficeint values are transferred to equalizer 18 through line 19-1, 19-2 and 19-3.

At the end of the training period, switches 12 and 14 of FIG. 1 go in position 2 and the data message is transmitted.

While the invention has been particularly shown and described with reference to the preferred embodiment thereof, it will be understood by those skilled in the art that various changes in form and details may be made therein without departing from the spirit and scope of the invention.

What is claimed is:

1. In a synchronous data transmission system comprising a transmitter for transmitting data through a transmission channel causing distortions to a receiver including a transversal equalizer to compensate for the effects of said distortion, a method for determining the initial values of the equalizer coefficients comprising the steps of:

selecting among the periodic binary pseudorandom sequences of length L, a sequence $(u_i)$ of L binary elements $u_i$ having the following property:

$$A_0 = L \text{ and } A_j = -1 \text{ for } j = 1, \ldots (L-1)$$

where $$A_j = \sum_{i=o}^{L-1} u_i u_{i+j}$$

adding to each element $u_i$ of the sequence $(u_i)$ a constant $m$ defined by the following relation:

$$m = \frac{-1 \pm \sqrt{1+L}}{L}$$

whereby building a sequence $(v_i)$ of L elements $v_i v_i = u_i + m$;

transmitting said sequence $(v_i)$ through the transmission channel;

receiving the sequence $(x_i)$ of elements $x_i$, each of the received elements $x_i$ corresponding to a transmitted element $v_i$, and determining the initial values of the equalizer coefficients from the received sequence $(x_i)$ and the transmitted sequence $(v_i)$.

2. A method according to claim 1 wherein the step of determining the coefficient initial values includes the following steps:

determining samples $r_j$ of the transmission channel impulse response obtained by correlating over a period L, the elements of received sequence $(x_i)$ with the elements of emitted sequence $(v_i)$, calculating autocorrelation matrix B of samples $r_j$; and determining the coefficient initial values from the following relation:

$$C_{opt} = B^{-1} R$$

where
$C_{opt}$ is the coefficient value column vector,
$B^{-1}$ is inversed matrix B, and
$R$ is the $r_j$ inversed column vector.

3. A method according to claim 2 wherein the determination of impulse response samples $r_j$ is obtained from the following relation:

$$r_j = \frac{1}{A_0^1} \sum_{i=0}^{L-1} x_{i+j} v_i$$

where $A_0^1$ is the first coefficeint of the autocorrelation function of the transmitted sequence ($v_i$).

4. A method according to claim 3 wherein the determination of the coefficient initial values from the following relation:

$$C_{opt} = B^{-1} R$$

is obtained by using the gradient method defined by:

$$C^{(n)} = C^{(n-1)} - \mu(B \, C^{(n-1)} - R)$$

where $C^{(n-1)}$ and $C^{(n)}$ respectively represent the coefficients column vectors at the $(n-1)^{th}$ and at the $n^{th}$ iteration, and $\mu$ is a constant.

5. A method according to claim 3 wherein $A_0^1 = L$.

6. In a synchronous data transmission system comprising a transmitter for transmitting data through a transmission channel causing distortions to a receiver including a transversal equalizer, a system for determining the initial values of the equalizer coefficeints comprising: in the transmitter means for generating a sequence ($v_i$) of $L$ elements $v_i$, each of the elements $v_i$ being defined by the relation $v_i = u_i + m$, where $u_i$'s are the binary elements of a periodic binary pseudo-random sequence ($u_i$) having the following property $A_0 = L$ and $A_j = -1$ for $j = 1, \ldots, (L-1)$ $$A_j = \sum_{i=0}^{L-1} u_i u_{i+j}$$

and $m$ is a constant defined by the following relation $$m = \frac{-1 \pm \sqrt{1+L}}{L}$$

means for transmitting said sequence ($v_i$) through the transmission channel, in the receiver means adapted for receiving the sequence ($x_i$) of elements $x_i$, each of the received elements $x_i$ corresponding to a transmitted element $v_i$, means for determining the samples $r_j$ of the transmission channel impulse response obtained by correlating over a period L the elements of received sequence ($x_i$) with the elements of emitted sequence ($v_i$);

means for calculating autocorrelation matrix B of samples $r_j$; and means for determining the coefficient initial values from the following relation:

$$C_{opt} = B^{-1} R$$

where $C_{opt}$ is the coefficient value column vector, $B^{-1}$ is inversed matrix B, and $R$ is the $r_j$ inversed column vector.

7. A system according to claim 6 in which said means for determining the samples of the transmission channel impulse response implement the following relation:

$$r_j = \frac{1}{A_0^1} \sum_{i=0}^{L-1} x_{i+j} v_i, \text{ and}$$

where $A_0^1$ is the first coefficient of the autocorrelation function of the sequence ($v_1$).

8. A system according to claim 7 wherein $A_0^1 = L$.

* * * * *